July 24, 1956

J. CALVANO 2,755,527

ADJUSTABLE BEARING REBABBITTING DIE

Filed Sept. 7, 1954

Inventor:
Joseph Calvano
By: Wallace and Cannon
Attorneys

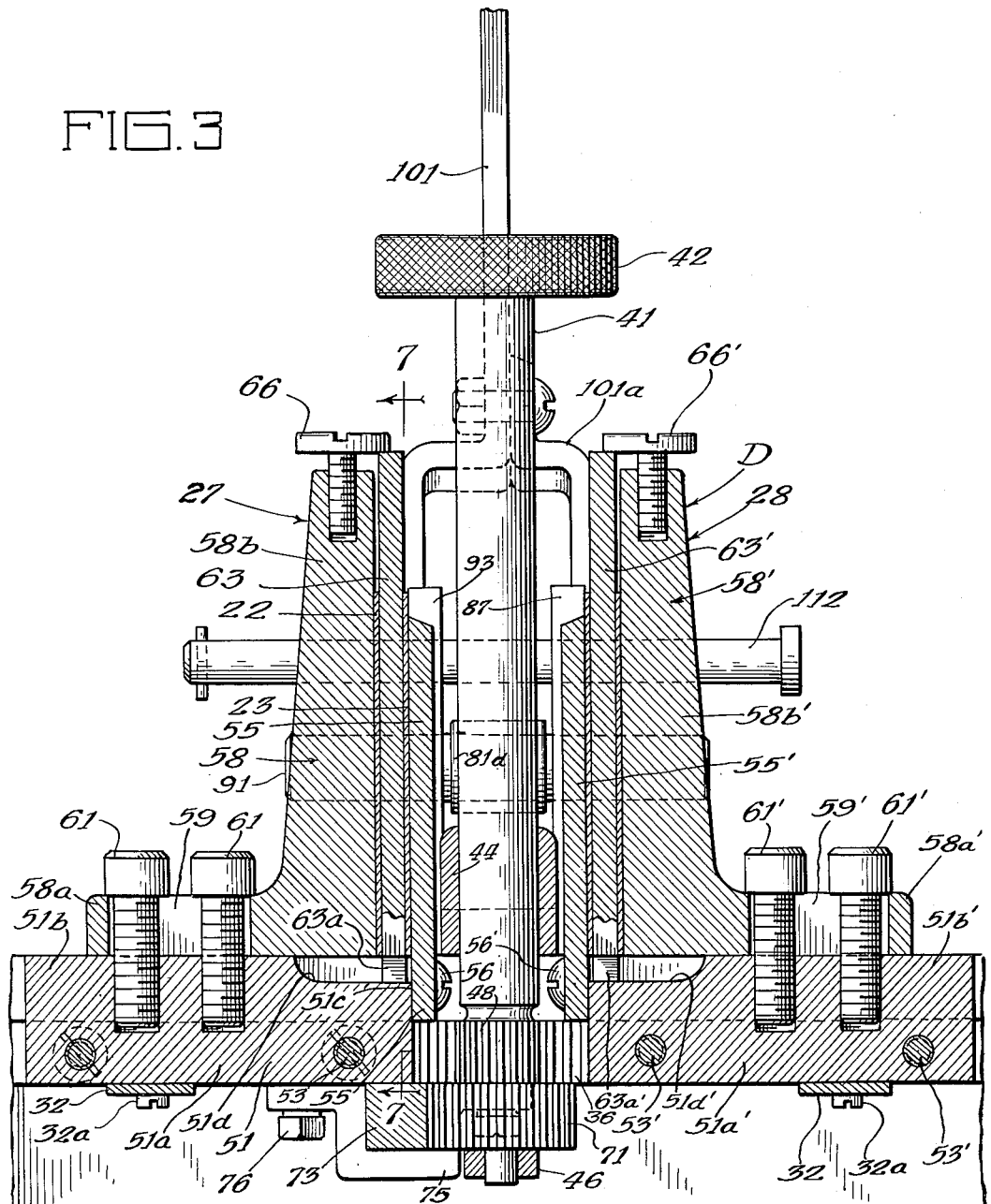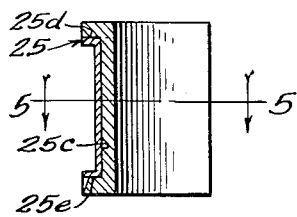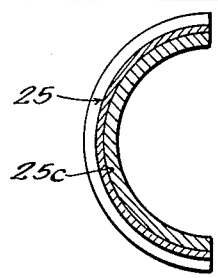

July 24, 1956 J. CALVANO 2,755,527
ADJUSTABLE BEARING REBABBITTING DIE
Filed Sept. 7, 1954 6 Sheets-Sheet 4
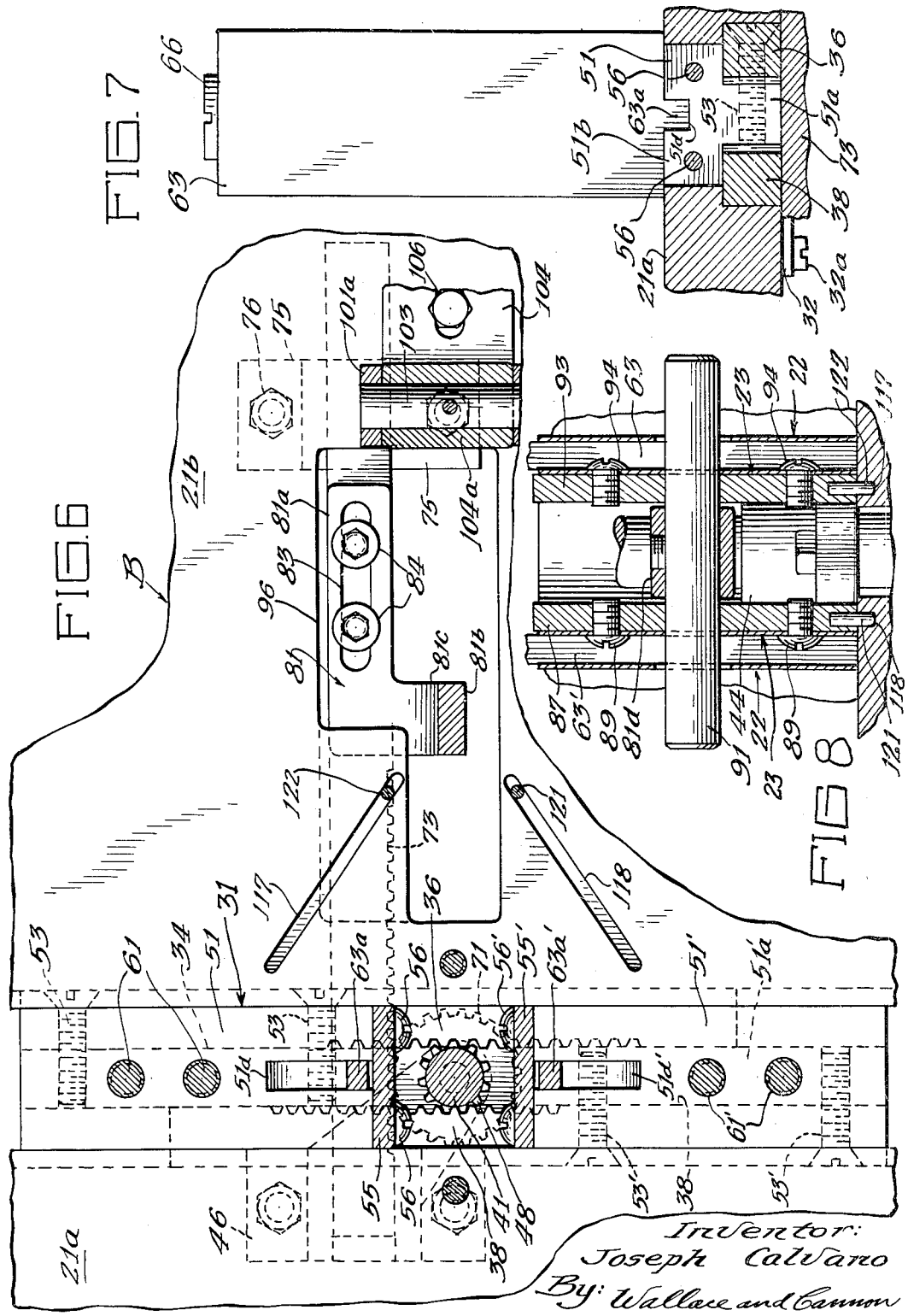
Inventor:
Joseph Calvano
By: Wallace and Cannon
Attorneys

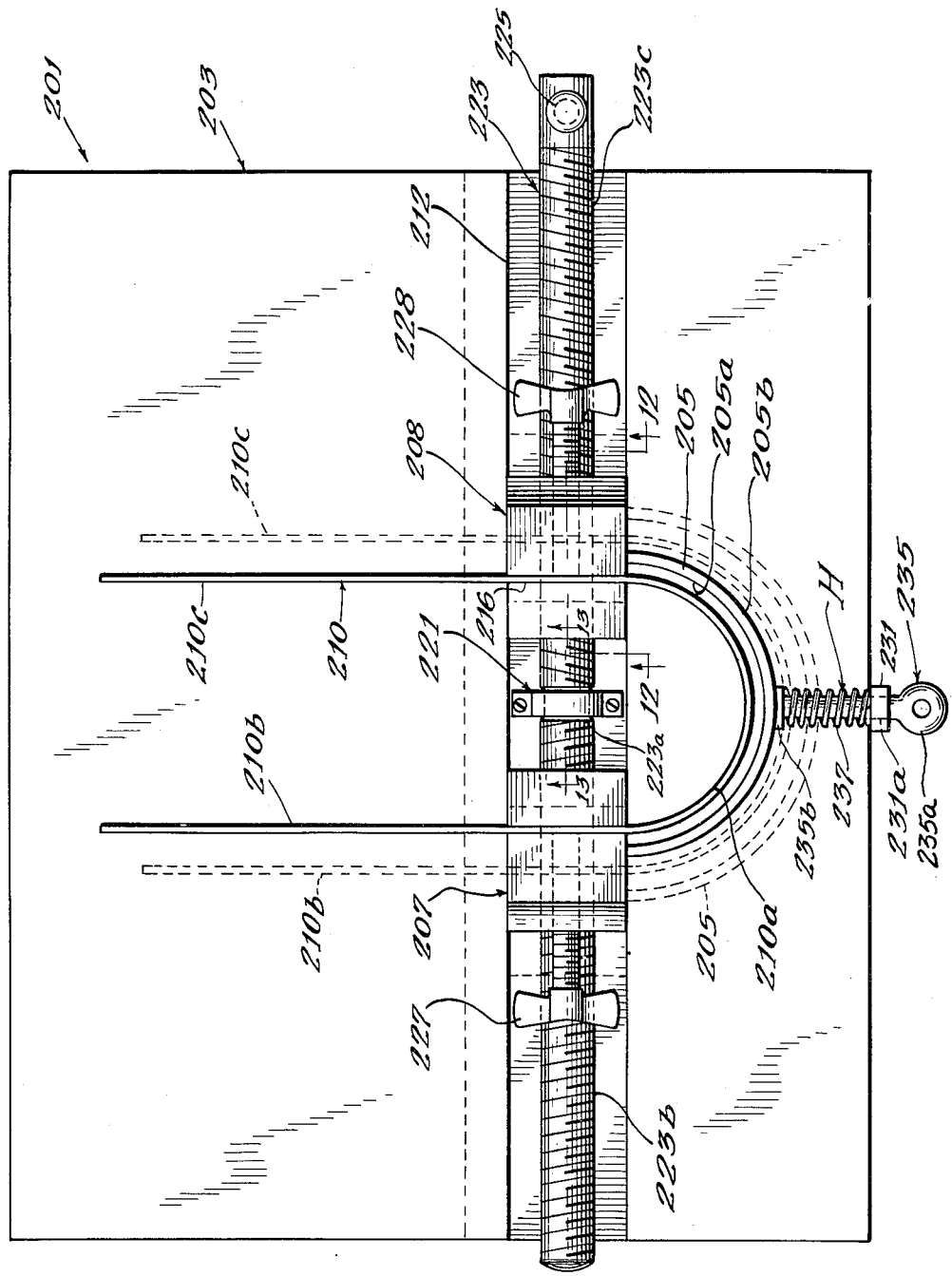

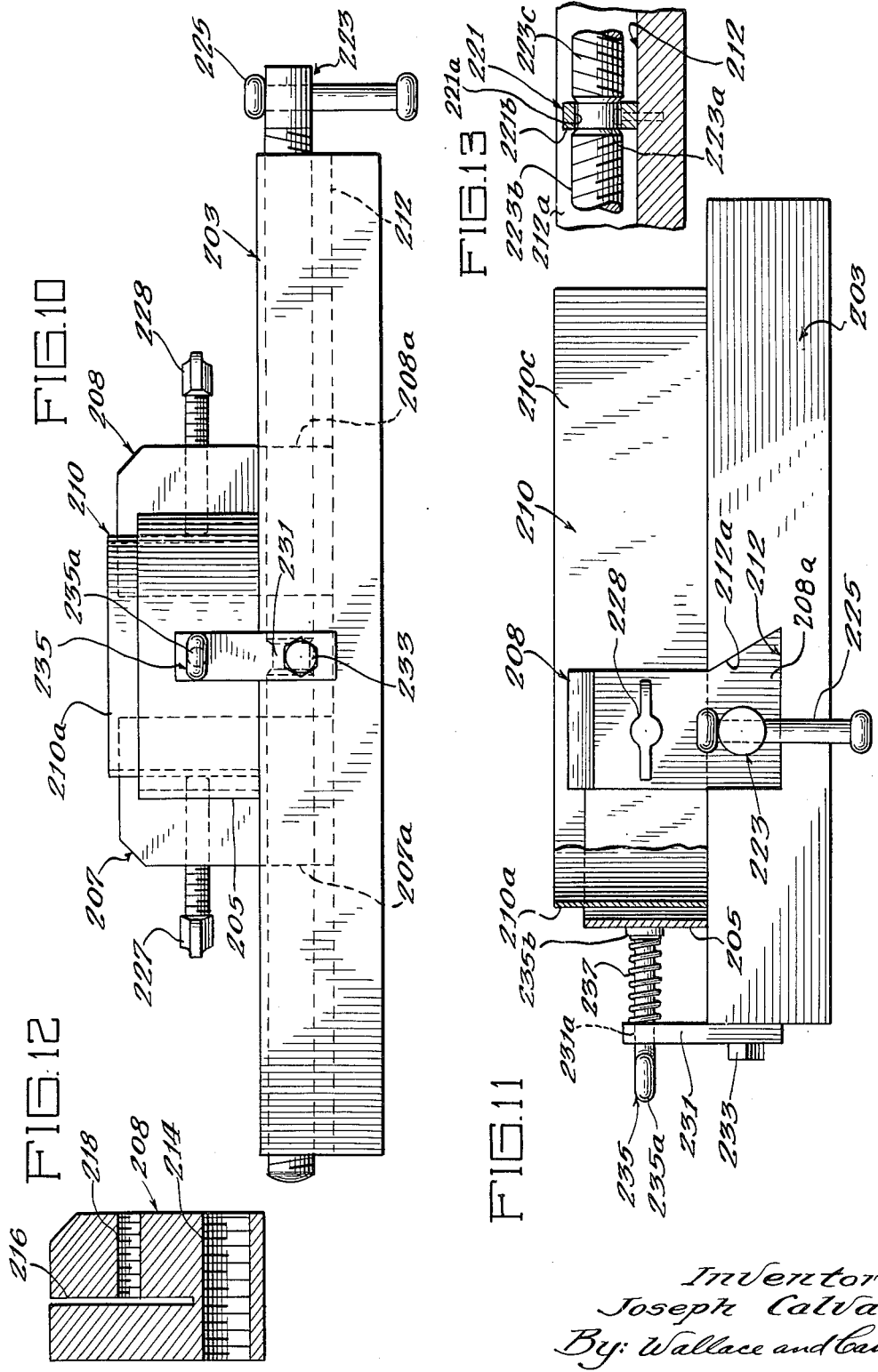

United States Patent Office 2,755,527
Patented July 24, 1956

2,755,527

ADJUSTABLE BEARING REBABBITTING DIE

Joseph Calvano, Chicago, Ill.

Application September 7, 1954, Serial No. 454,587

26 Claims. (Cl. 22—123)

This invention relates to jigs and more particularly to jigs for use in re-babbitting bearings, and the like.

The primary object of my invention is to provide a novel jig with which bearing shells may be relined with babbitt, or the like, in a novel and expeditious manner.

Another object of my invention is to enable steel backs and other forms of sectional bearings to be quickly and easily relined with bearing material.

Yet another object of my invention is to afford a jig of the aforementioned type which supports a bearing shell, to be relined, in a novel and expeditious manner.

A further object of my invention is to provide a jig of the aforementioned type which may be quickly and easily adjusted in a novel and expeditious manner to accommodate bearing shells of different sizes and shapes.

Another object is to provide a novel jig of the aforementioned type which embodies novel flexible structure, constituted and arranged in a novel and expeditious manner, to afford a novel form into which babbitt, and the like may be poured to form a bearing lining on a bearing shell.

A further object of my invention is to provide a novel jig of the aforementioned type which is practical, reliable, and efficient in operation and which may be readily and economically produced commercially.

Other and further objects of the present invention will be apparent from the following description and claims and are illustrated in the accompanying drawings, which, by way of illustration, show a preferred embodiment of the present invention and the principles thereof and what I now consider to be the best mode in which I have contemplated applying these principles. Other embodiments of the inventions embodying the same or equivalent principles may be used and structural changes may be made as desired by those skilled in the art without departing from the present invention and the purview of the appended claims.

In the drawings:

Fig. 3 is a sectional view taken substantially along the line 3—3 in Fig. 1;

Fig. 4 is a sectional view through a bearing, of the main bearing type, which may be readily relined with my novel device;

Fig. 5 is a sectional view taken substantially along the line 5—5 in Fig. 4;

Fig. 6 is a sectional view taken substantially along the line 6—6 in Fig. 2;

Fig. 7 is a sectional view taken substantially along the line 7—7 in Fig. 3;

Fig. 8 is a detail sectional view taken substantially along the line 8—8 in Fig. 1;

Fig. 9 is a top plan view of the modified form of my invention;

Fig. 10 is a side elevational view of the device shown in Fig. 9;

Fig. 11 is an end elevational view of the device shown in Fig. 9;

Fig. 12 is a detail sectional view taken substantially along the line 12—12 in Fig. 9; and Fig. 13 is a detail sectional view taken substantially along the line 13—13 in Fig. 10.

Figure 1:
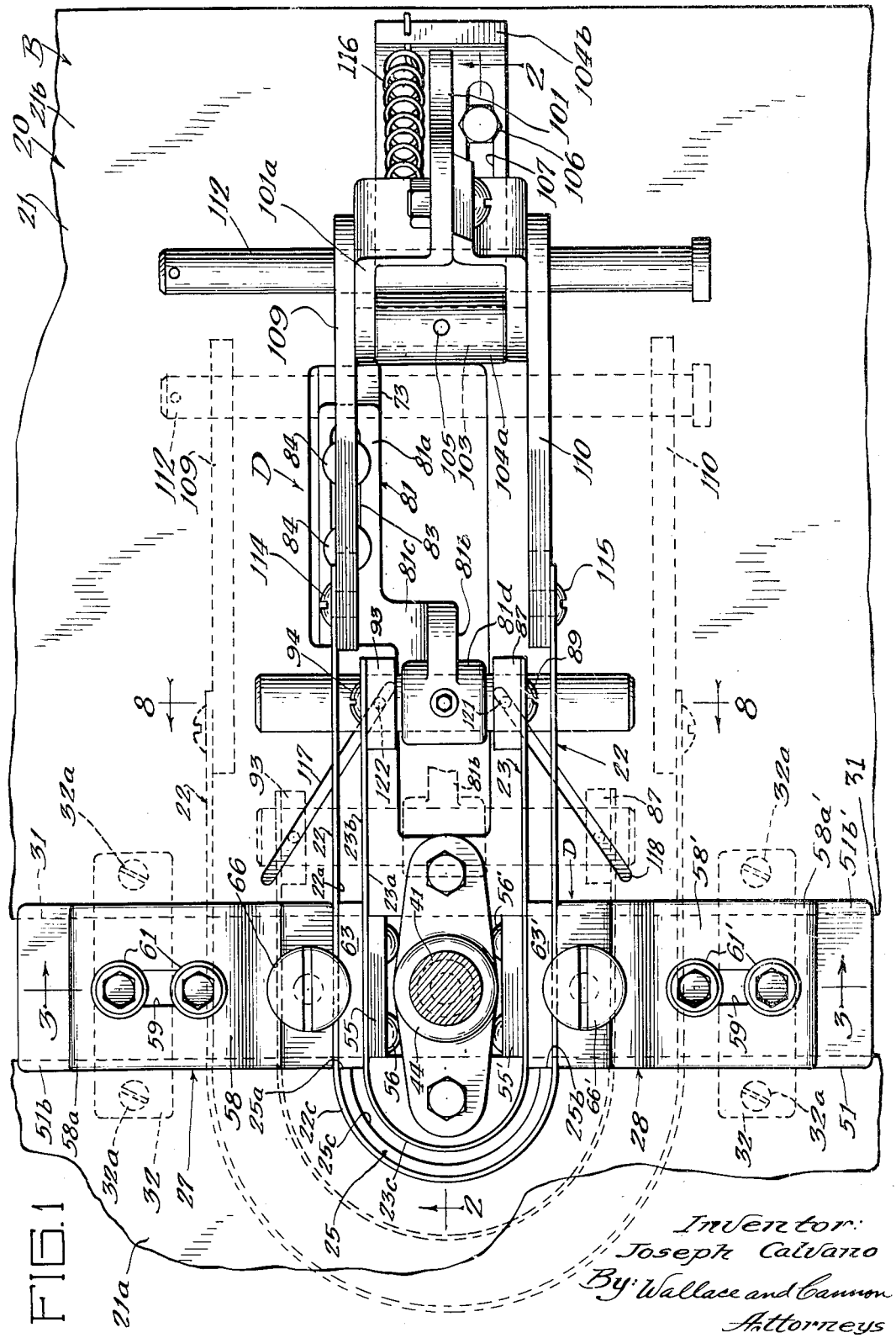
Fig. 1 is a top plan view of a babbitting jig embodying the principles of my invention.

In the drawings a babbitting device or jig 20, embodying the principles of my invention, is shown to illustrate the preferred embodiment of my invention. In general, the novel jig 20 comprises a rectangular shaped base plate or base B on which is mounted a holding device D which is operable to hold a bearing shell such as, for example, the bearing shell 25, Figs. 2, 4 and 5, on the base B in position wherein bearing-lining material such as babbitt may be readily applied to the surfaces to be lined such as, for example, the inner concave face 25c, and the two lateral edges 25d and 25e, Figs. 1 and 2.

The holding device D embodies two elongated, substantially rectangular-shaped bands or straps 22 and 23 which are disposed in position on the base B to hold the bearing shell 25 in upright position wherein the end edges 25a and 25b thereof are disposed in abutting engagement with the front faces 27a and 28a of two clamping blocks 27 and 28, respectively, projecting upwardly from the upper face 21 of the base B, Fig. 1.

The inner and outer bands 23 and 22, respectively, may be made of any suitable material such as, for example, spring steel, or the like, to which babbitt will not adhere and, if desired, as will be appreciated by those skilled in the art, the surfaces of the bands 22 and 23 which will come in contact with the babbitt may be properly treated so as to insure that the babbitt will not adhere thereto such as, for example, by coating them with lamp black. The bands 22 and 23 are mounted on and extend through the clamping blocks 27 and 28 in such position that the longitudinal edges thereof are disposed in parallel relation to the face 21 of the base B, and the inner and outer faces 22a and 22b, and 23a and 23b of the bands 22 and 23, respectively, are disposed in upright perpendicular relation to the face 21. The bands 22 and 23 are bent at their longitudinal center portions 22c and 23c, respectively, into semi-circular shaped arcs corresponding in size and shape to the outer and inner faces, respectively, of the bearing it is desired to re-babbitt. That is, the arc of the center portion 22c of the outer band 22 is of such size and shape that the inner face 22a thereof fits snugly around the outer surface of the shell 25 in position to hold the end edges 25a and 25b, Fig. 1, of the shell 25 in abutting relation to the front faces 27a and 27b of the clamping blocks 27 and 28, respectively, and the center portion 23c of the inner band 23 is spaced inwardly from the center portion 22a, in parallel relation thereto, such a distance that it is spaced from the inner face 25c of the shell 25 a distance corresponding to the thickness of the babbitt which it is desired to apply to the inner face 25c of the shell 25.

Figure 2:
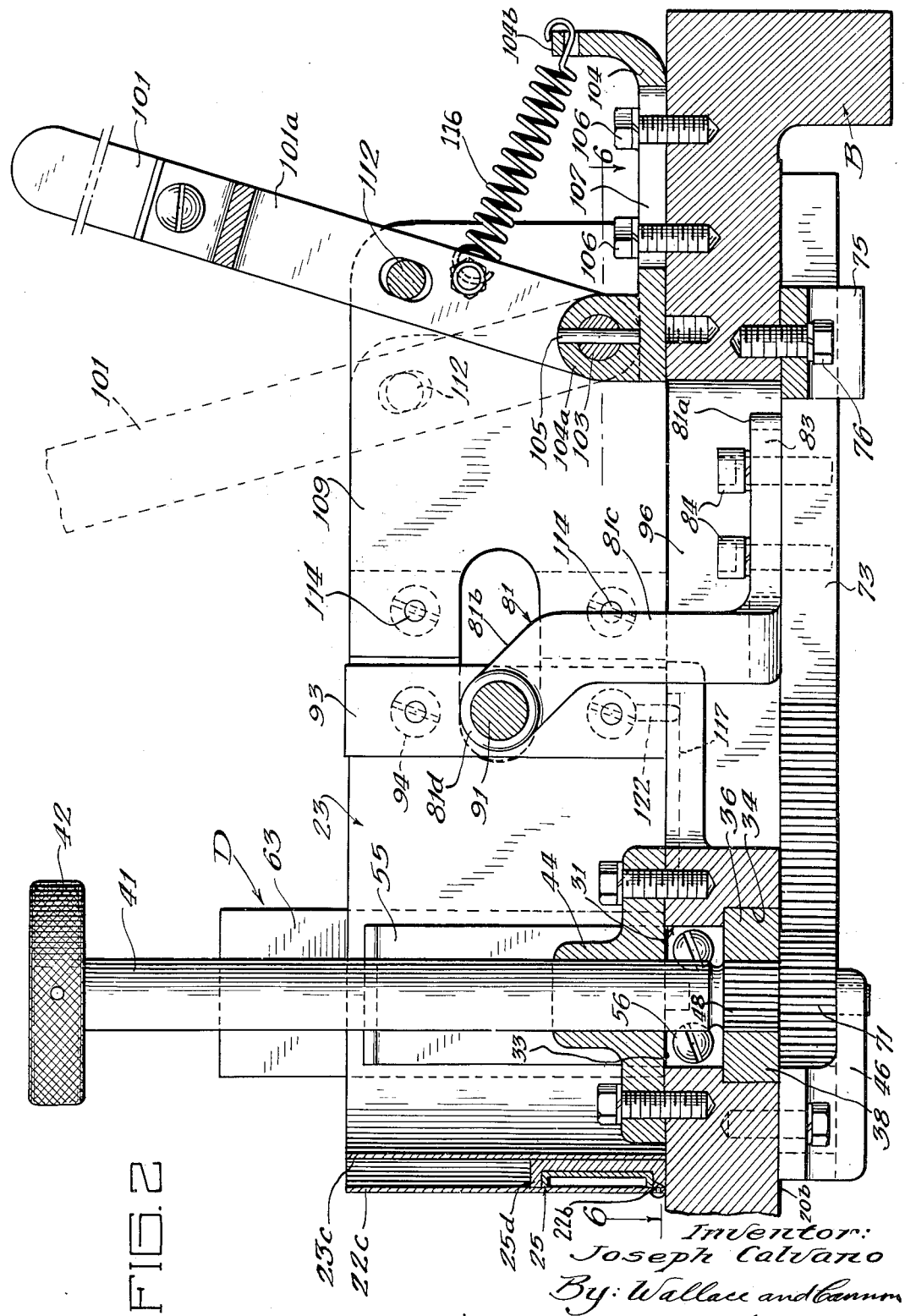
Fig. 2 is a detail sectional view taken substantially along the line 2—2 in Fig. 1.

When it is desired to reline a bearing of the type commonly used as main bearings, wherein bearing material is disposed on all three surfaces 25c, 25d and 25e thereof, a small ear 22b, Fig. 2, may be formed on the inner face 22a of the center portion 22c of the outer band 22 in position to engage the bottom edge 25c of the shell 25 to thereby hold the shell 25 in upwardly spaced relation to the base 20, Fig. 2, so that when the babbitt is poured into the space between the shell 25 and the center portion 23c of the inner band 23, the babbitt may flow under the shell 25. Enough babbitt may then be poured into the space between the center portions 22c and 23c of the bands 22 and 23 to cover the upper edge 25d of the shell 25 with the same thickness of babbitt as is disposed below the bottom edge 25e so as to re-babbitt not only the inner face 25c of the shell 25 but also the outer lateral edges 25d and 25e thereof.

With my novel re-babbitting jig 20, the arcs of the center portions 22c and 23c of the bands 22 and 23, respectively, may be readily adjusted to properly accommodate bearing shells of various sizes. To accomplish this, the clamping blocks 27 and 28 are adjustably mounted on the base B, and the bands 22 and 23 are longitudinally adjustable relative to the clamping blocks 27 and 28, all in a novel and expeditious manner as will be discussed in greater detail hereinafter.

A slot 31 is formed in the base B and extends laterally thereacross to afford a track for the clamping blocks 27 and 28. The front end portion 21a and rear end portion 21b of the base B may be secured together in any suitable manner such as, for example, by brackets 32 secured to the lower faces thereof by screws 32a, Figs. 1 and 2.

The slot 31 is substantially inverted T-shaped in cross section, Fig. 2, having an upper body portion 33 and an enlarged lower body portion 34. Two racks 36 and 38 are mounted in the head 34 of the slot 31 at opposite sides thereof for longitudinal reciprocation therein. An elongated shaft 41 having a hand wheel 42 mounted on its upper end, Figs. 2 and 3, is journalled in a bracket 44 mounted on the upper face 21 of the base B and in a bracket 46 mounted on the lower face 20b of the base 20 in position to extend vertically between the racks 36 and 38. A pinion gear 48 is mounted on the shaft 41 between the racks 36 and 38 and is operatively meshed therewith so that upon rotation of the shaft 41, by turning of the hand wheel 42, the racks 36 and 38 are caused to slide longitudinally in opposite directions relative to each other in the head 34 of the slot 31.

The clamping block 27 embodies a slide 51 of substantially T-shaped cross-section, Figs. 3 and 7, having a lower shank 51a and an enlarged upper head 51b. The slide 51 is mounted in the slot 31 in such position that the upper head 51b thereof is disposed in the upper body portion 33 of the slot 31 and rests on the racks 36 and 38, and the shank portion 51a thereof projects downwardly between the racks 36 and 38. The rack 36 is connected to the slide 51 by suitable means such as screws 53, Figs. 6 and 7, so that upon longitudinal movement of the rack 36 in the slot 31, the slide 51 is correspondingly moved therewith. An elongated plate or inner band holder 55 is disposed in upright position in the slot 31 in the base B and is secured to the inner face 51c of the slide 51 by suitable means such as screws 56, Figs. 3, 6 and 7, and projects upwardly above the base 20 to afford an inner supporting member for the inner band 23. A substantially L-shaped outer band holder 58 having a lower leg 58a and a substantially vertically extending upper leg 58b is mounted on the slide 51 with the leg 58a disposed in juxtaposition to the upper surface of the slide 51, Fig. 3, and extending laterally outwardly beyond the longitudinal edges of the slot 31 to rest on the upper face 20a of the base 20, Figs. 1 and 2. An elongated slot 59 is formed in the leg 58a of the outer holder 58 and two bolts 61 extend through the slot 59 into the slide 51 to thereby adjustably mount the outer holder 58 on the slide 51 for movement longitudinally of the slot 31 toward and away from the inner holder 55.

An elongated plate or spacer 63 is mounted on the slide 51 between the inner holder 55 and the upper leg 58b of the outer holder 58 in parallel relation thereto. The spacer 63 has a tongue 63a formed on the central lower end portion thereof, Figs. 3 and 7, and the tongue projects downwardly into a longitudinally extending slot 51d formed in the upper face of the slide 51 at the inner end portion of the latter, Figs. 3 and 7 to hold the spacer 63 against lateral displacement relative to the slide 51. A screw 66, Fig. 3, is removably mounted on the upper end of the leg 58b of the outer holder 58 with the head thereof disposed in overlying relation to the spacer 63 to thereby hold the spacer 63 in abutting relation to the upper face of the slide 51. Hence, it will be seen that the spacer 63 is releasably held against movement from this position between the holders 55 and 58 by the tongue 63a and the screw 66, but, if it is desired to replace the spacer 63 with a spacer of different size, this may be readily accomplished by removing the screw 66, and then lifting the spacer 63 upwardly from between the holders 55 and 58. A new spacer 63 may then be inserted between the holders 55 and 58 and the screw 66 may again be inserted in holding position relative thereto on the upper end of the holder 58.

As is best seen in Figs. 1 and 3, the bands 22 and 23 are disposed in the clamping block 27 in such position that the outer band 22 is disposed between the upper leg 58b of the holder 58 and the spacer 63, and the inner band 23 is disposed between the inner holder 55 and the spacer 63. With this construction it will be seen that the spacing between the bands 22 and 23 is determined by the thickness of the spacer 63 and may be readily adjusted by changing the spacer 63 to afford a spacer of the desired size between the inner and outer holders 55 and 58 and simultaneously adjusting the spacing of the outer holder 58 from the inner holder 55 by releasing the bolts 61, moving the outer holder 58 to the desired position, and then again securing the bolts 61. In positioning the holder 58 relative to the holder 55, the holder 58 may be disposed in such position that the bands 22 and 23 are engaged by the holder 58 and the spacer 63, and the holder 55 and the spacer 63, respectively, with a snug, but sliding fit, so that the bands 22 and 23 will be held in upright position but are free to slide longitudinally through the space between the spacer 63 and the holders 58 and 55, respectively.

The clamping block 28 is identical in construction to the clamping block 27 and the parts thereof are indicated in the drawings by the same reference numerals as the corresponding parts of the clamping block 27 with a prime mark added thereto. It will be noted that the clamping block 28 is attached to the rack 38 by means of screws 53' extending through the rack 58 into the shank 51a' of the slide 51', Figs. 3 and 6.

Hence, it will be seen that by rotating the hand wheel 42, the shaft 41 may be rotated to thereby turn the gear 48 and cause the racks 36 and 38 to be moved longitudinally of the slot 31 in opposite directions relative to each other to thereby move the clamping blocks 27 and 28 along the slot 31 in opposite directions to each other and expand or contract the arcs of the center portions 22c and 23c of the bands 22 and 23. So that the heighth of the arcs of the center portions 22c and 23c, or in other words, the distance that the center portions 22c and 23c project forwardly from the clamping blocks 27 and 28, may be readily varied in accordance with the variations of the widths of the arcs thereof during inward and outward movement of the clamping blocks 27 and 28 relative to each other, I afford a novel mechanism on my novel jig 20 for shifting the bands 22 and 23 longitudinally inwardly and outwardly through the blocks 27 and 28 during inward and outward adjustment of the latter relative to each other.

As a part of this latter mechanism, a gear 71 is mounted on the shaft 41 below the gear 48, and an elongated rack 73 is mounted on the lower face of the base B in meshing engagement with the gear 71 by means of brackets 75 mounted on the base B by bolts 76, Figs. 2 and 3. The rack 73 extends substantially perpendicularly to the length of the racks 36 and 38, and a substantially Z-shaped bracket 81 having a lower leg 81a, an upper leg 81b and an intermediate leg 81c interconnecting the lower and upper legs 81a and 81b, Figs. 1 and 2, is mounted on the upper face of the rack 73 with the leg 81a on the bracket 81 disposed in parallel relation to the rack 73 and in juxtaposition thereto. An elongated slot 83 is formed in the leg 81a of the bracket 81 and the bracket 81 is adjustably secured to the rack 73 by two bolts 84 which extend through the slot 83 and are threadedly engaged in the rack 73, Fig. 2. A boss 81d is formed on the free end portion of the upper leg 81b of the bracket 81 and a pin 91, Figs. 1 and 8, is mounted in the boss 81b and extends laterally therethrough. A mounting block 87 is slidably mounted on one end portion of the pin 91 in substantially parallel relation to the rack 73, and the rear end portion of the inner band 23 is secured to the outer face of the block 87 by screws 89, Figs. 1 and 8. The pin 91 projects outwardly from the other end portion of the boss 81b and a mounting block 93 is slidably mounted on the pin 91 at the opposite end thereof from the mounting block 87, and the other rear end portion of the inner band 23 is secured to the block 93 by screws 94.

The bracket 81 is mounted in a slot 96 formed in the base B of the jig 20 and the slot 96 is of such shape that the bracket 81 is free to reciprocate perpendicularly to the racks 36 and 38 through the range of movement necessary to move the band 23 longitudinally outwardly and inwardly through the clamping blocks 27 and 28 to maintain the heighth of the arc of the central portion 23c in proper relation to the width of the arc thereof during outward and inward movements of the clamping blocks 27 and 28 relative to each other along the track 31.

It will be noted that rotation of the shaft 41 during outward and inward adjustment of the clamping blocks 27 and 28 relative to each other is simultaneously effective through the connection of the gear 71 and the rack 73 to correspondingly move the bracket 81 toward and away from the longitudinal center line of the clamping blocks 27 and 28, to thereby move the band 23 outwardly and inwardly through the clamping blocks 27 and 28 the desired amount.

At the rear end of the base B, Figs. 1 and 2, a hand lever 101, having a yoke 101a formed at the lower end portion thereof, is pivotally mounted on a shaft 103 mounted in a boss 104a on a bracket 104 which is mounted on the rear edge portion of the upper face 21 of the base B. The bracket 104 is adjustably secured to the base B for adjusting movement toward and away from the clamping blocks 27 and 28, by bolts 106 extending through an elongated slot 107 formed in the bracket 104. The shaft 103 is secured in the boss 104a by a pin 105, Fig. 2, and the outer ends thereof extend into the opposite legs of the yoke 101a, Figs. 1 and 2. Two mounting blocks 109 and 110 are mounted in upright position on the base B on opposite sides of the boss 104a, Figs. 1 and 2, and a rod 112 extends through the handle 101 above the yoke 101a and through the mounting blocks 109 and 110. The opposite end portions of the outer band 22 are secured to the mounting blocks 109 and 110, respectively, by screws 114 and 115, respectively, Figs. 1 and 2, forwardly of the bar 112. A tension coil spring 116 is connected at is forward end to the handle 101 above the shaft 103 and is connected at its rear end to a rib 104b formed on the bracket 104. The spring 116 is effective to urge the handle 101 to rotate in a clockwise direction as viewed in Fig. 2 and thereby, through the action of the rod 112 on the mounting blocks 109 and 110 urge the mounting blocks 109 and 110 and the outer band 22 rearwardly or, in other words, to the right as viewed in Fig. 1.

During adjustment of the size of the arcs of the center portions 22c and 23c of the bands 22 and 23, the bolts 106 may be loosened in the base B and the bracket 104 may then be slid toward or away from the clamping blocks 27 and 28 into the position necessary to maintain the central portion 22c of the outer band 22 in the desired spaced relation to the central portion 23c of the inner band 23.

When it is desired to insert a bearing shell such as the bearing shell 25 between the center portions 22a and 23a of the bands 22 and 23, the upper end portion of the handle 101 may be manually moved forwardly or, in other words, to the left as viewed in Fig. 2, to thereby push the rod 112 toward the clamping blocks 27 and 28 and slide the outer band 22 outwardly through the clamping blocks 27 and 28 to thereby increase the space between the arcs 22a and 23a of the bands 22 and 23. The shell 25 may then be dropped downwardly into position between the arcs 22a and 23a and the handle 101 may then be released to permit the spring 116 to rotate it in clockwise direction as viewed in Fig. 2 to thereby pull the outer band 22 rearwardly and bring the arc 22a into snug fitting clamping relation to the shell 25. Babbitt, or other suitable bearing material, may then be poured into the space between the central portions 22c and 23c to a depth sufficient to completely cover the shell 25. When babbitting a shell of the main bearing type such as shown at 25 in the drawings, the babbitting metal is poured to a level sufficiently above the shell 25 to insure a bearing surface of the desired thickness on the face 25b of the shell 25. It will be remembered that the ear 22d on the outer band 22 is effective to hold the shell 25 in upwardly spaced position relative to the upper face 21 of the base B so that the babbitt may flow beneath the shell 25 to form a similar surface of bearing metal on the face 25e of the shell 25. The ear 22d on the outer band 22 is preferably thin and projects inwardly only a slight distance so as to cause only a slight irregularity in the bearing surface formed on the face 25e of the shell 25 and in lifting the handle 101 toward the clamping blocks 27 and 28, the handle 101 is moved in such a manner that the ear 22d is not entirely retracted from the position in which it will abut the shell 25 when the shell 25 is dropped into the space between the center portions 22a and 23a.

If desired, my novel jig 20 may be used for relining plain bearings of the type wherein the inner face 25c thereof is the only surface on which bearing material is deposited. To accomplish this the bearing shell is permitted to rest directly on the upper face 21 of the base B when disposed in position between the bands 22 and 23 to receive bearing material. For this purpose I prefer to use an outer band 22 which has no ear, such as the ear 22d, thereon so as to insure tight fitting relation of the inner face 22a of the band 22 to the outer surface of the bearing shell.

It will be noted that the blocks 109 and 110, to which the outer ends of the outer band 22 are attached, are slidably mounted on the rod 112 and that, similarly, the mounting blocks 87 and 93, to which the outer ends of the inner band 23 are attached, are slidably mounted on the pin 91 in the boss 81d.

In this manner, during outward movement of the clamping blocks 27 and 28, the mounting blocks 109 and 110 may be manually slid outwardly on the rod 112 and the mounting blocks 87 and 93 may slide outwardly on the pin 91 so that the inner end portions of the bands 22 and 23 are retained in straight alignment with the portions thereof extending through the blocks 27 and 28 to thereby prevent bending or crimping of the bands 22 and 23.

Two grooves 117 and 118, which are disposed at an obtuse angle to each other which opens toward the clamping blocks 27 and 28, are formed in the upper face 21 of the base B and two pins 121 and 122 are mounted on the lower ends of the mounting blocks 87 and 93, respectively, and project downwardly into the grooves 117 and 118, Figs. 6 and 8, so that during forward movement of the mounting blocks 87 and 93 with the rack 73, the mounting blocks 87 and 93 are automatically cammed outwardly to a position corresponding to the corresponding position of the clamping blocks 27 and 28. Similarly, rearward movement of the mounting blocks 87 and 93 with the rack 73 is effective to automatically cam the mounting blocks 87 and 93 inwardly to a position corresponding to the position of the clamping blocks 27 and 28.

Hence, it will be seen that my novel jig 20 may be quickly and easily adjusted to accommodate bearing shells of different sizes, and, in operation, may be readily and effectively used for quickly and easily relining bearing shells.

In Figs. 9 to 13, a modified form of my invention is illustrated. The jig 201 shown in Figs. 9 to 13 embodies, in general, a base 203 on which a bearing shell such as bearing shell 205 may be held by a holding device H in abutting engagement with two clamping blocks 207 and 208 in such position that the inner face 205a of the shell 205 is disposed in spaced parallel relation to the substantially arcuate-shaped central portion 210a of an elongated flexible sheet or band 210 mounted in the clamping blocks 207 and 208.

The base 203 comprises a substantially rectangular shaped block having an elongated slot 212 formed in and extending across the upper face thereof. The blocks 207 and 208 are slidably mounted in the slot 212 for movement therealong toward and away from each other. The slot 212 is preferably undercut as shown at 212a and each of the clamping blocks 207 and 208 has a base portion 207a and 208a, respectively, Fig. 10, which is complementary in cross section to the slot 212 and is mounted therein, Fig. 11.

The blocks 207 and 208 are identical in construction except that they are reverse images of each other. Each embodies a threaded opening 214, Fig. 12, extending laterally therethrough in alignment with the length of the slot 212. Also, each embodies an upwardly opening slot 216 extending laterally therethrough in substantially perpendicular relation to the opening 214. Also, each embodies an elongated threaded opening 218 disposed in substantially parallel relation to the opening 214 and opening at one end into the slot 216 and at the other end into the outer surface of the block 207 or 208 which is parallel to the slot 216.

A bracket 221 is mounted in the longitudinal central portion of the slot 212 and has an opening 221a extending laterally therethrough. An elongated feed screw 223 having a substantially V-shaped groove 223a formed in the longitudinal center portion thereof, is journalled in the bracket 221 with the annular portion 221b of the latter, which defines the opening 221a, disposed in the groove 223a to thereby prevent longitudinal movement of the feed screw 223. The feed screw 223 is of the reverse-thread type, the threads on the opposite end portions 223b and 223c thereof being oppositely formed. The end portion 223b of the feed screw 223 extends through and is threadedly engaged in the opening 214 in the clamping block 207, and, similarly, the end portion 223c of the feed screw 223 extends through and is threadedly engaged in the opening 214 in the clamping block 208. A handle 225 is mounted on the end portion 223c of the feed screw 223 for rotating the feed screw 223, and it will be seen that upon rotation of the feed screw 223 in the bracket 221 the clamping blocks 207 and 208 will be caused to move in opposite directions longitudinally of the slot 212.

The band 210, as is best seen in Fig. 9, is substantially U-shaped in form, embodying a central arcuate shaped portion 210a from the opposite ends of which project two legs 210b and 210c, respectively. The legs 210b and 210c are mounted in the slots 216 of the clamping blocks 207 and 208, respectively, and may be moved longitudinally therethrough to thereby cause the central portion 210a of the band 210 to move inwardly or outwardly relative to the clamping blocks 207 and 208. The band 210 may be releasably held in stationary position in the blocks 207 and 208 by bolts 227 and 228 threadedly engaged in the opening 218 in the blocks 207 and 208, respectively, and which may be screwed into the respective openings 218 into position wherein they clampingly abut the outer faces of the legs 210b and 210c, respectively, Fig. 10.

Hence, it will be seen that the central portion 210a of the band 210 may be adjusted into an arcuate shape of any desired size by manually moving the legs 210b and 210c longitudinally through the clamping blocks 207 and 208 and adjusting the clamping blocks 207 and 208 into the proper position relative to each other in the slot 212 by turning the feed screw 223. With the band 210 thus properly positioned, a bearing shell such as the bearing shell 205, having an arcuate shaped inner surface 205a on which it is desired to place a bearing lining may be disposed on the upper face of the base 203 in abutting engagement with the clamping blocks 207 and 208 in such position that the inner face 205a is disposed around the central portion 210a of the band 210 in parallel relation thereto. With the bearing shell 205 disposed in such position, suitable bearing material, such as, for example, molten babbit may be poured into the space between the inner face 205a of the bearing shell 205 and the outer surface of the central portion 210a of the band 210 where it will adhere to the face 205a of the shell 205.

To hold a bearing shell such as the bearing shell 205 in the aforementioned proper position on the base 203 I have afforded a holding device H which may be readily engaged with and released from such a shell. The holding device H embodies an elongated mounting bracket 231 secured at its lower end portion by a bolt 233 to the base 203. The bracket 231 projects upwardly from the base 203 and has a opening 231a extending therethrough along a line disposed centrally between and parallel to the legs 210b and 210c of the band 210. An elongated plunger 235 having a handle 235a formed at one end thereof and a radially outwardly projecting flange 235b formed at the other end thereof is slidably mounted in the opening 231a in the bracket 231 with the end carrying the flange 235b projecting toward the central portion 210a of the band 210. A compression coil spring 237 is mounted on the plunger 235 and is disposed in abutting engagement at one end with the bracket 231 and at the other end with the flange 235 and, is therefore, effective to yieldingly urge the plunger 235 toward the central portion 210a of the band 210.

It will be seen that by pulling outwardly on the handle 235a of the plunger 235 the plunger 235 may be pulled outwardly through the bracket 231 against the urging of the spring 237 to a position wherein the flange 235b of the plunger 235 is disposed a distance away from the central portion 210a of the band 210 sufficient that a bearing shell such as the bearing shell 205 may be readily dropped between the plunger 235 and the clamping blocks 207 and 208 into a position wherein the bearing shell 205 is disposed around, and in parallel spaced relation to the band 210. The plunger 235 may then be released to thereby permit the spring 237 to move the plunger 235 inwardly through the bracket 231 into position wherein the flange 235b engages the outer surface 205b of the bearing 205 to thereby yieldingly clamp the bearing 205 into the aforementioned position against the clamping blocks 207 and 208.

It will be seen that the jig 201 affords a practical device which is particularly well adapted for use in re-babbiting plain bearings having only one face carrying bearing material.

From the foregoing, it will be seen that my invention affords novel jigs which may be quickly and easily used in relining bearings.

Also it will be seen that I have afforded a novel jig which is sturdy in construction, practical, reliable, and efficient in operation, and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. A babbitting jig comprising a base, flexible bearing-surface defining means, means on said base and engaged with said first mentioned means in supporting relation thereto, said second mentioned means being movable on said base to thereby move said first mentioned means into different positions for defining bearing surfaces of different sizes, and means mounted on said base for holding a bearing member in spaced relation to said first mentioned means for the reception of bearing material between said bearing member and said first mentioned means.

2. A babbitting jig for use in re-lining a concave face of a bearing and comprising a base, flexible form means mounted on said base, adjusting means mounted on said base, said adjusting means being engaged with said form means and movable on said base for moving said form means into a curvature of smaller size, and parallel to, the curvature of said concave face of such a bearing, and means on said base for holding said bearing on said base in position wherein said face is disposed in parallel spaced relation to said form means.

3. A babbitting jig for use in re-lining a concave face of a bearing when the bearing is disposed in a predetermined operative position, said jig comprising a base, means for holding said bearing in said operative position on said base, and means for defining with said face a vertically extending form for the reception of bearing material therein in engagement with said face, said means comprising an elongated flexible member mounted on said base, and means engaged with said flexible member and movably mounted on said base for flexing said flexible member into a position wherein the latter is disposed in parallel spaced relation to said face when said bearing is disposed in said operative position.

4. A babbitting jig for use in re-lining a face of a bearing member and comprising a base, clamping means mounted on said base, means mounted on said base for holding such a bearing member in abutting engagement with said clamping means with said face disposed in inwardly facing relation to said clamping means, flexible means mounted on said clamping means in position wherein said flexible means projects from said clamping means in parallel spaced relation to said face when said bearing member is disposed in said abutting engagement with said clamping means, and means, including said clamping means, movably mounted on said base for altering said position of said flexible means.

5. A babbitting jig for use in re-lining a face of a bearing member, said jig comprising a base, and means for mounting such a bearing member in operative position on said base and defining with said bearing member a form for the reception of bearing material therein in engagement with said face, said means comprising clamping means mounted on said base, an elongated sheet member mounted in said clamping means and having a portion projecting toward said position, and means mounted on said base and operatively connected to said clamping means and said sheet member for moving said clamping means relative to said base and moving said sheet member relative to said clamping means, simultaneously, to thereby move said portion of said sheet member toward and away from said position.

6. A babbitting jig for use in re-lining a face of a bearing member, said jig comprising a base, and means for mounting such a bearing member in operative position on said base and defining with said bearing member a form for the reception of bearing material in engagement with said face, said means comprising clamping means mounted on said base, an elongated sheet member mounted in said clamping means and having a substantially arcuate-shaped portion projecting toward said position, and means mounted on said base and operatively connected to said clamping means and said sheet member for moving said clamping means relative to said base and said sheet member relative to said clamping means for radially expanding and contracting said arcuate-shaped portion of said sheet member along all the radii of said arcuate-shaped portion.

7. A babbitting jig for use in re-babbitting bearing members and comprising a base, flexible means for defining the inner face of a bearing lining, clamping means mounted on said base and engaged with said flexible means in position to support the latter in upright position on said base, means for holding such a bearing member on said base in spaced parallel relation to said flexible means, feeding means connected to said flexible means and movable on said base through a predetermined path of travel for moving said flexible means inwardly and outwardly through said clamping means, and means mounted on said base and operatively connected to said clamping means and said feeding means for simultaneously reciprocating said clamping means and said feeding means relative to said base to thereby move said flexible means through increasing and decreasing arcs.

8. A jig for use in re-babbitting bearing members and comprising a base, two clamping members movably mounted on said base for movement toward and away from each other along a predetermined path of travel on said base, an elongated flexible member mounted on said base with the opposite end portions thereof mounted in and extending through a respective one of said clamping members in such position that a central portion of said flexible member is disposed in an arc projecting outwardly from said clamping members, said flexible member being movable inwardly and outwardly relative to said clamping members to thereby draw said projecting portion inwardly toward said clamping members and move said projecting portion outwardly away from said clamping members, means on said base for mounting such a bearing member in substantially parallel spaced relation to said central portion, and means for expanding and contracting said arc of said central portion, said last named means comprising drive means mounted on said base and operatively connected to said clamping members for moving said clamping members toward and away from each other along said predetermined path.

9. A jig for use in re-babbitting bearing members and comprising a base, two clamping members movably mounted on said base for movement toward and away from each other along a predetermined path of travel on said base, an elongated flexible member mounted on said base with the opposite end portions thereof mounted in and extending through a respective one of said clamping members in such position that a central portion of said flexible member is disposed in an arc projecting outwardly from said clamping members, said flexible member being movable inwardly and outwardly relative to said clamping members to thereby draw said projecting portion inwardly toward said clamping members and move said projecting portion outwardly away from said clamping members, means on said base, including said clamping members, for releasably mounting such a bearing member in parallel spaced relation to said central portion in position to receive babbitt between said bearing member and said central portion, and means for flexing said flexible member inwardly and outwardly to thereby enlarge and reduce the size of said arc of said central portion, said last named means comprising two elongated racks slidably mounted on said base in substantially parallel relation to each other, each of said racks being connected to a respective one of said clamping members for movement therewith, and gear means rotatably mounted on said base and engaged with said racks for sliding said racks on said base in opposite directions relative to each other upon rotation of said gear means.

10. A jig for use in re-babbitting bearing members and comprising a base, two clamping members movably mounted on said base for movement toward and away from each other along a predetermined path of travel on said base, an elongated flexible member mounted on said base with the opposite end portions thereof mounted in and extending through a respective one of said clamping members in such position that a central portion of said flexible member is disposed in an arc projecting outwardly from said clamping members, said flexible member being movable inwardly and outwardly relative to said clamping members to thereby draw said projecting portion inwardly toward said clamping members and move said projecting portion outwardly away from said clamping members, means on said base, including said clamping members, for releasably mounting such a bearing member in position on said base for receiving babbitt between said bearing and said central portion in bearing-lining-forming position relative to said bearing member, and means for expanding and contracting the arc of said central portion, said last named means comprising two elongated racks slidably mounted on said base in parallel relation to said path of travel and each other, each of said racks being connected to a respective one of said clamping members and movable therewith, gear means rotatably mounted on said base between said racks in operative engagement with the latter and operable upon oscillation relative to said base to reciprocate said racks in opposite directions opposite to each other and thereby reciprocate said clamping members along said path of travel and open and close the mouth of said arc of said central portion, and means mounted on said base and supportingly engaged with said end portions of said flexible member on the opposite side of said clamping members from said central portion for carrying said end portions outwardly and inwardly relative to each other during said reciprocation of said clamping members.

11. A jig for use in relining bearing members and comprising a base plate, a flexible elongated sheet member having a substantially U-shaped central portion and two legs projecting from said central portion in substantially parallel relation to each other, two clamping members movably mounted on said base for movement toward and away from each other along a predetermined path of movement across said base plate, each of said legs being mounted in and projecting from a respective one of said clamping members, said legs being movable longitudinally through said clamping members, means for holding such a bearing member on said base in spaced relation around said central portion in position to receive bearing-lining material between said bearing member and said central portion in engagement with said bearing member, and rotatable means operatively connected to said clamping members and said sheet member for simultaneously moving said legs longitudinally through said clamping members and moving said clamping members along said path of movement upon rotation of said last mentioned means.

12. A jig for use in relining the inner surface of a bearing member having parallel convex outer and concave inner surfaces, said jig comprising a base, a flexible elongated outer sheet member having a substantially arcuate-shaped central portion and two legs projecting in the same general direction from opposite ends of said central portion and in spaced relation to each other, a flexible elongated inner sheet member having a substantially arcuate-shaped central portion and two legs projecting in the same general direction from opposite ends of said last mentioned central portion and in spaced relation to each other, clamping means mounted on said base, said sheet members being mounted in said clamping means and supported thereby in position to project laterally in perpendicular upward relation to said base, said inner sheet member being disposed inwardly of said outer sheet member with said central portion of said inner sheet member being disposed in substantially parallel spaced relation to said central portion of said outer sheet member when said sheet members are disposed in normal operative position relative to each other, said outer sheet member being movable through said clamping means to thereby move said central portion thereof into and out of said normal operative position of the latter, and means for releasably holding such a bearing member in lining-receiving position on said base wherein said inner surface is disposed around said central portion of said inner sheet member in parallel spaced relation thereto, said last named means comprising said central portion of said outer sheet member, means mounted on said base and connected to said outer sheet member for moving said outer sheet member outwardly through said clamping means to thereby move said central portion thereof outwardly away from said central portion of said inner sheet member to receive said bearing member therebetween, and means connected to said outer sheet member for urging said outer sheet member to move through said clamping means inwardly toward said central portion of said inner sheet member to thereby urge said central portion of said outer sheet member into clamping engagement with said convex outer surface of said bearing member when said bearing member is disposed in said lining-receiving position.

13. A jig for use in relining the inner surface of a bearing member having parallel convex outer and concave inner surfaces, said jig comprising a base, a flexible elongated outer sheet member having a substantially arcuate-shaped central portion and two legs projecting in the same general direction from opposite ends of said central portion and in spaced relation to each other, a flexible elongated inner sheet member having a substantially arcuate-shaped central portion and two legs projecting in the same general direction from opposite ends of said last mentioned central portion and in spaced relation to each other, two clamping members movably mounted on said base for movement toward and away from each other, each of said clamping members being supportingly engaged with a respective leg of each of said sheet members, said sheet members being disposed in parallel spaced relation to each other with said inner member spaced inwardly from said outer member a distance such that such a bearing member may be disposed in lining-receiving position between said central portions of said sheet members with said central portion of said outer sheet member disposed in clamping engagement with said outer convex surface of said bearing member, and said central portion of said inner sheet member disposed in inwardly spaced relation to said inner concave surface of said bearing member for the reception of lining material therebetween, and means mounted on said base and connected to said sheet members and to said clamping members for moving said sheet members relative to said clamping members and moving said clamping members relative to each other to thereby move said central portions into various shapes to thereby conform to a plurality of sizes of bearing members.

14. A jig for use in relining the inner surface of a bearing member having parallel convex outer and concave inner surfaces, said jig comprising a base, two clamping blocks, each of said clamping blocks comprising an inner holding member and an outer holding member disposed in substantially parallel relation to each other, and a spacer member removably mounted between said holding members in substantially parallel relation thereto, an outer elongated flexible member having a substantially arcuate-shaped central portion and two oppositely disposed end portions, each of said end portions being mounted in a respective one of said blocks between said outer holding member and said spacer thereof, an inner elongated flexible member having a substantially arcuate-shaped central portion and two oppositely disposed end portions, each of said end portions of said inner flexible member being mounted in a respective one of said blocks between said inner holding member and said spacer thereof, said inner and outer flexible members being disposed in position in said clamping members wherein said central portions thereof are disposed in spaced relation to each other to receive such a bearing member in such position therebetween that said central portion of said outer flexible member is disposed around said convex outer surface of said bearing in juxtaposition thereto, and said central portion of said inner flexible member is disposed in inwardly spaced relation to said concave inner face of said bearing member to afford a space therebetween for the reception of lining material, and means mounted on said base and including said clamping blocks for moving said flexible members to thereby vary the size of said arcs of said central portions.

15. A jig for use in relining the inner surface of a bearing member having parallel convex outer and concave inner surfaces, said jig comprising a base, two clamping blocks, each of said clamping blocks comprising an inner holding member and an outer holding member disposed in substantially parallel relation to each other, and a spacer member removably mounted between said holding members in substantially parallel relation thereto, an outer elongated flexible member having a substantially arcuate-shaped central portion and two oppositely disposed end portions, each of said end portions being mounted in a respective one of said blocks between said outer holding member and said spacer thereof, an inner elongated flexible member having a substantially arcuate-shaped central portion and two oppositely disposed end portions, each of said end portions of said inner flexible member being mounted in a respective one of said blocks between said inner holding member and said spacer thereof, said inner and outer flexible members being disposed in position in said clamping members wherein said central portions thereof are disposed in spaced relation to each other to receive such a bearing member in such position therebetween that said central portion of said outer flexible member is disposed around said convex outer surface of said bearing in juxtaposition thereto, and said central portion of said inner flexible member is disposed in inwardly spaced relation to said concave inner face of said bearing member to afford a space therebetween for the reception of lining material, and means mounted on said base and operatively connected to said clamping blocks for moving said clamping blocks toward and away from each other to thereby open and close said arcs of said central portions.

16. A jig as defined in claim 15 and which includes means mounted on said base and supportingly engaged with said end portions of said flexible members in spaced relation to said blocks for carrying said end portions inwardly and outwardly on said base during such movement of said clamping blocks toward and away from each other.

17. A jig for use in relining the inner surface of a bearing member having parallel convex outer and concave inner surfaces, said jig comprising a base, two clamping blocks, each of said clamping blocks comprising an inner holding member and an outer holding member disposed in substantially parallel relation to each other, and a spacer member removably mounted between said holding members in substantially parallel relation thereto, an outer elongated flexible member having a substantially arcuate-shaped central portion and two oppositely disposed end portions, each of said end portions being mounted in a respective one of said blocks between said outer holding member and said spacer thereof, an inner elongated flexible member having a substantially arcuate-shaped central portion and two oppositely disposed end portions, each of said end portions of said inner flexible member being mounted in a respective one of said blocks between said inner holding member and said spacer thereof, said inner and outer flexible members being disposed in position in said clamping members wherein said central portions thereof are disposed in spaced relation to each other to receive such a bearing member in such position therebetween that said central portion of said outer flexible member is disposed around said convex outer surface of said bearing in juxtaposition thereto, and said central portion of said inner flexible member is disposed in inwardly spaced relation to said concave inner face of said bearing member to afford a space therebetween for the reception of lining material, and means for moving said blocks toward and away from each other to thereby close and open the arcs of said central portions of said flexible members, said last named means comprising two racks slidably mounted in parallel relation to each other for longitudinal sliding movement on said base, each of said racks being attached to a respective one of said blocks and movable therewith, and drive means disposed between said inner holding members and engaged with said racks for moving said racks longitudinally on said base in opposite directions to each other.

18. A jig for use in relining the inner surface of a bearing member having parallel convex outer and concave inner surfaces, said jig comprising a base, two clamping blocks, each of said clamping blocks comprising an inner holding member and an outer holding member disposed in substantially parallel relation to each other, and a spacer member removably mounted between said holding members in substantially parallel relation thereto, an outer elongated flexible member having a substantially arcuate-shaped central portion and two oppositely disposed end portions, each of said end portions being mounted in a respective one of said blocks between said outer holding member and said spacer thereof, an inner elongated flexible member having a substantially arcuate-shaped central portion and two oppositely disposed end portions, each of said end portions of said inner flexible member being mounted in a respective one of said blocks between said inner holding member and said spacer thereof, said inner and outer flexible members being disposed in position in said clamping members wherein said central portions thereof are disposed in spaced relation to each other to receive such a bearing member in such position therebetween that said central portion of said outer flexible member is disposed around said convex outer surface of said bearing in juxtaposition thereto, and said central portion of said inner flexible member is disposed in inwardly spaced relation to said concave inner face of said bearing member to afford a space therebetween for the reception of lining material, and means for adjusting the size of the arcs of said central portion, said last named means comprising means mounted on said base and conected to said outer flexible member for moving said central portion of the latter inwardly and outwardly relative to said blocks, three elongated racks slidably mounted for longitudinal sliding movement on said base, two of said racks being disposed in parallel relation to each other, the third of said racks being disposed substantially perpendicular to said two racks and in parallel relation to said end portions of said inner flexible member, each of said two racks being connected to a respective one of said blocks and movable therewith, means mounted on said third rack and connected to said end portions of said inner flexible member for moving the latter inwardly and outwardly through said clamping blocks upon longitudinal reciprocation of said third rack, and drive means mounted on said base and drivingly connected to said three racks for simultaneously reciprocating the latter to thereby move said blocks inwardly and outwardly relative to each other and move said inner flexible member inwardly and outwardly through said blocks.

19. A jig as defined in claim 18 and which includes means for carrying said end portions of said flexible members inwardly and outwardly on said base in accordance with said inner and outer movement of said blocks, said last named means comprising four supporting blocks, each of said supporting blocks being supportingly engaged with one of said end portions of said flexible members and slidably mounted on said base.

20. A jig as defined in claim 18 and which includes means for carrying said end portions of said flexible members inwardly and outwardly on said base in accordance with said inner and outer movement of said blocks, said last named means comprising four supporting blocks, each of said supporting blocks being supportingly engaged with one of said end portions of said flexible members and slidably mounted on said base, two substantially straight elongated slots formed in said base at an angle to each other, said angle opening toward said clamping blocks, the two supporting blocks attached to said end portions of said inner flexible member each having a pin projecting downwardly therefrom and disposed in a respective one of said slots for reciprocatory movement therealong, and means movably mounting said two blocks on said third rack, said last named means comprising an arm mounted on said third rack and projecting upwardly therefrom, an elongated pin mounted in said arm and extending through said supporting blocks, said supporting blocks being slidably supported by said pin for movement therealong toward and away from each other.

21. A jig as defined in claim 18 and in which said means mounted on said base and connected to said outer flexible member for moving said central portion of the latter inwardly and outwardly relative to said clamping blocks comprises a bracket movably mounted on said base for movement toward and away from said blocks, a lever pivotally mounted on said bracket for swinging movement toward and away from said blocks, said lever being attached to said end portions of said outer flexible member, and spring means connected to said lever and urging the latter to swing in said bracket away from said blocks.

22. A babbitting jig comprising a base, two clamping blocks slidably mounted on said base for reciprocation toward and away from each other, an elongated flexible member having an arcuate-shaped central portion and two oppositely disposed end portions projecting from said central portion, said flexible member being mounted on said base with each of said end portions mounted in a respective one of said clamping blocks and said central portion projecting outwardly away from said clamping blocks, said end portions being movable longitudinally through said clamping block to thereby move said central portion toward and away from said blocks, means mounted on said base and connected to said clamping blocks for moving said blocks toward and away from each other to thereby close and open the arc of said central portion, and means mounted on said base for holding a bearing shell in abutting relation to said clamping blocks around said central portion in spaced parallel relation to the latter.

23. A babbitting jig comprising a base, two clamping blocks slidably mounted on said base for reciprocation toward and away from each other, an elongated flexible member having an arcuate-shaped central portion and two oppositely disposed end portions projecting from said central portion, said flexible member being mounted on said base with each of said end portions mounted in a respective one of said clamping blocks and said central portion projecting outwardly away from said clamping blocks, said end portions being movable longitudinally through said clamping block to thereby move said central portion toward and away from said blocks, means mounted on said base and connected to said clamping blocks for moving said blocks toward and away from each other to thereby close and open the arc of said central portion, and means mounted on said base for holding a bearing shell in abutting relation to said clamping blocks around said central portion in spaced parallel relation to the latter, said last named means comprising a supporting member mounted on and projecting upwardly from said base on the opposite side of said central portion from said clamping blocks, an elongated plunger slidably mounted in said supporting member for longitudinal movement toward and away from said central portion, and spring means connected to said plunger and urging said plunger toward said central portion.

24. A babbitting jig comprising a base having an upwardly opening elongated slot therein, two clamping blocks slidably mounted in said slot for reciprocation longitudinally thereof toward and away from each other, a substantially U-shaped flexible sheet member having two elongated legs and a substantially arcuate-shaped central portion, said sheet member being mounted in upright position on said base with each of said legs mounted in and projecting through a respective one of said blocks, and said central portion projecting convex outwardly away from said blocks, a feed screw rotatably mounted on said base and connected to said blocks for moving said blocks longitudinally of said slot toward and away from each other, and means for holding a bearing shell around said central portion in spaced parallel relation thereto in position for the reception of bearing material between said bearing shell and said central portion.

25. A babbitting jig comprising a base having an upwardly opening elongated slot therein, two clamping blocks slidably mounted in said slot for reciprocation longitudinally thereof toward and away from each other, a substantially U-shaped flexible sheet member having two elongated legs and a substantially arcuate-shaped central portion, said sheet member being mounted in upright position on said base with each of said legs mounted in and projecting through a respective one of said blocks, means threadedly engaged with said blocks for releasably holding said legs stationary in said blocks, said central portion of said sheet member projecting from said blocks in a direction parallel to the adjacent surface of said base, means engaged with said blocks for holding said blocks stationary in said slot, and holding means mounted on said base on the other side of said central portion from said blocks for holding a bearing shell on said base around said central portion in spaced parallel relation to the latter.

26. A jig for use in relining the inner surface of a bearing member having an outer surface and a concave inner surface, said jig comprising a base having an upwardly opening elongated slot therein, two clamping blocks projecting upwardly from said base, said blocks being slidably mounted in said slot for reciprocation toward and away from each other longitudinally of said slot, an elongated flexible sheet member disposed in lateral upright position on said base, said sheet member having an arcuate-shaped central portion and two substantially parallel opposite end portions projecting from said central portion, each of said end portions being slidably mounted in and projecting through a respective one of said clamping blocks for longitudinal sliding movement therethrough, screw means mounted in said clamping blocks and abuttingly engaged with said legs for releasably holding said legs stationary in said blocks, supporting means mounted in said slot intermediate the ends thereof, an elongated feed screw journalled at its center in said supporting means and threadedly engaged with said blocks for reciprocating said blocks toward and away from each other in said slot, and means for releasably holding such a bearing member in abutting engagement with said blocks in such position that said inner surface thereof is disposed around said central portion of said sheet member in spaced parallel relation thereto, said last named means comprising an elongated member mounted on and projecting upwardly from said base on the opposite side of said central portion of said sheet member from said clamping blocks, an elongated plunger slidably mounted in said elongated member for longitudinal sliding movement therethrough into and out of position to clampingly engage said outer surface of said bearing member, and a compression coil spring mounted on said plunger and engaged with said elongated member in position to urge said plunger toward said clamping position.

References Cited in the file of this patent

UNITED STATES PATENTS

| | | |
|---|---|---|
| 595,825 | Uebelacker | Dec. 21, 1897 |
| 1,598,540 | Miller | Aug. 31, 1926 |
| 2,246,603 | Slade | June 24, 1941 |
| 2,275,057 | Reis | Mar. 3, 1942 |